Dec. 3, 1957          W. S. ANDERSON          2,815,415
MOVEMENT RESPONSIVE CONTROL APPARATUS, ESPECIALLY
FOR TEMPERATURE RESPONSE
Filed May 29, 1956                           2 Sheets—Sheet 1
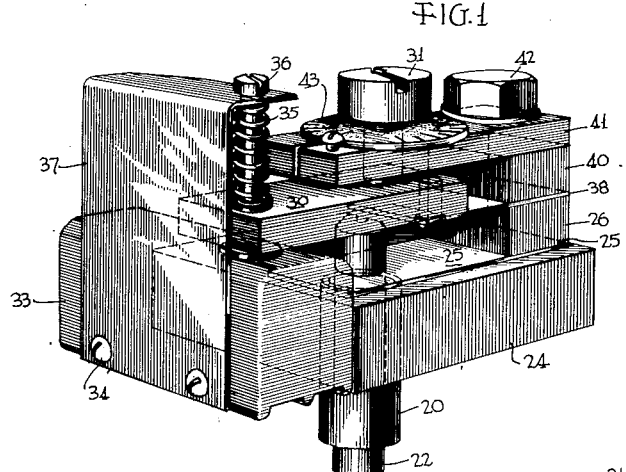
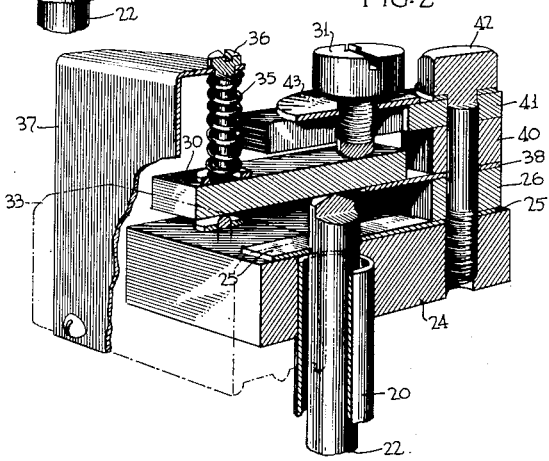
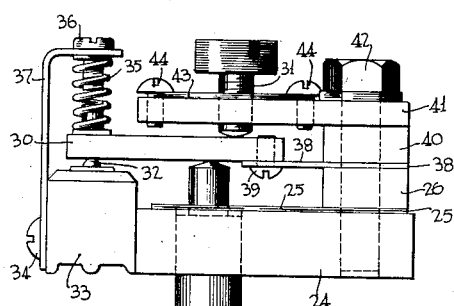
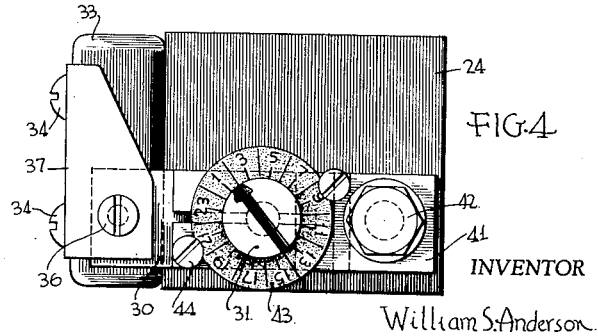
INVENTOR
William S. Anderson
BY
Wm. R. Glisson
ATTORNEY Dec. 3, 1957 W. S. ANDERSON 2,815,415
MOVEMENT RESPONSIVE CONTROL APPARATUS, ESPECIALLY
FOR TEMPERATURE RESPONSE
Filed May 29, 1956 2 Sheets-Sheet 2
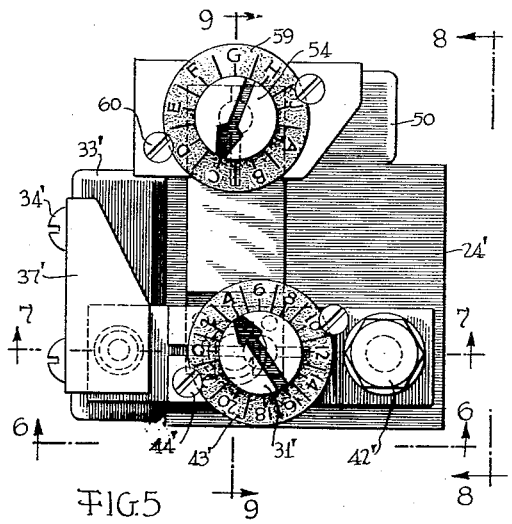
FIG.5
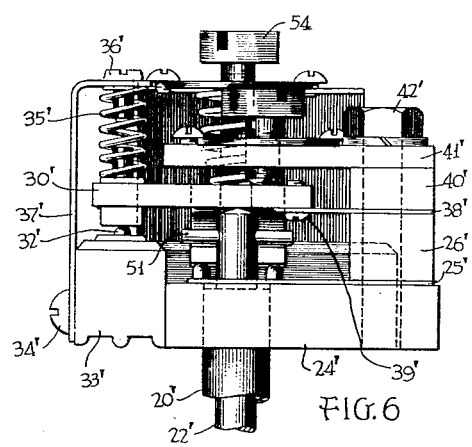
FIG.6
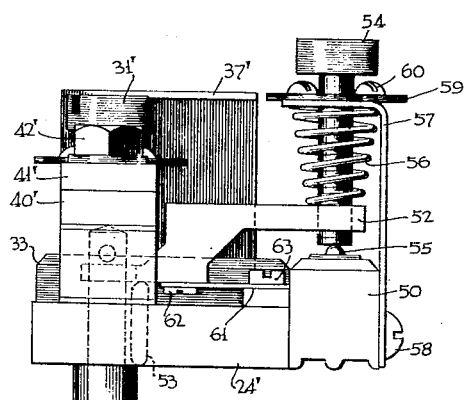
FIG.8
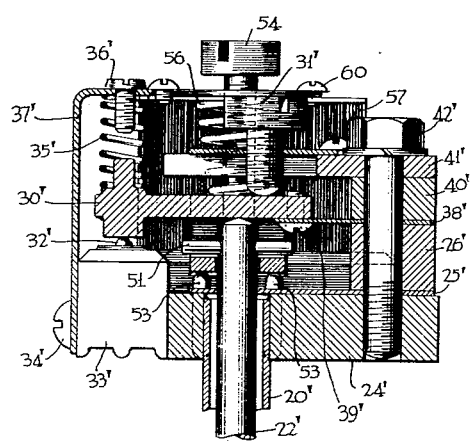
FIG.7
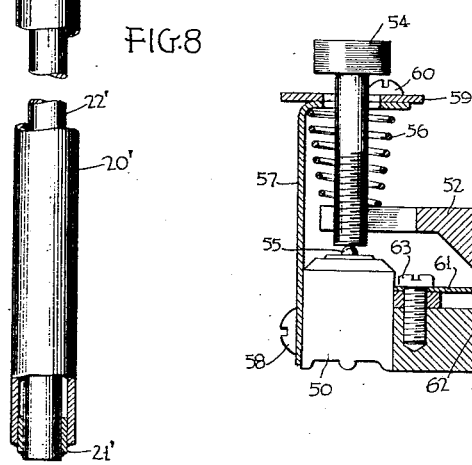
FIG.9
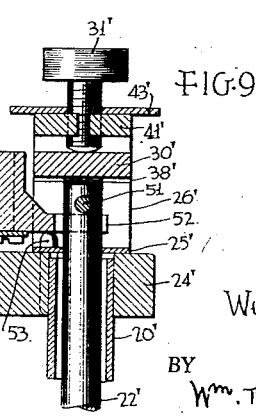
INVENTOR
William S. Anderson.
BY
Wm. R. Glisson
ATTORNEY United States Patent Office 2,815,415
Patented Dec. 3, 1957

2,815,415

MOVEMENT RESPONSIVE CONTROL APPARATUS, ESPECIALLY FOR TEMPERATURE RESPONSE

William S. Anderson, Williamsport, Pa., assignor of one-half to James E. Axeman, Williamsport, Pa.

Application May 29, 1956, Serial No. 588,125

7 Claims. (Cl. 200—137)

This invention relates to movement responsive control apparatus and has for an object the provision of improvements in this art.

One of the particular objects of the invention is to provide a movement responsive device which is very precise in its action and which will maintain this precision over long periods of service.

Another object is to provide a temperature responsive device which requires relatively small power, as for example that derived from change in temperature, for operation.

Another object is to provide control apparatus which employs an attached substantially free floating lever or beam which is relatively unaffected by its attaching or aligning means and is thereby rendered more fully responsive to the control action to which it is subjected.

Another object is to provide beam mounting means which is extremely resistant to lateral disalignment but which offers substantially no resistance to movement of the beam in the plane of the forces acting thereon.

Another object is to provide a control device which can be easily adjusted for action and in which the adjustment will be reliably maintained.

Another object is to provide a control device in which one of the forces affecting the controlled element—for example a limit switch of small movement—will act in the line of action of the controlled element and will constantly act in a "fail safe" direction on the controlled element.

Another object is to provide a controlled lever system which does not impose any reaction on the actuating element therefor at one side of the range at which the actuating element is designed and adjusted to operate.

Another object is to provide a duplex or compound control device wherein a plurality of control elements are actuated from a single operating element.

Another object is to provide a compound control device deriving movement from a single operating element wherein the operating element affects different controlled elements at different times and in different senses or directions of movement so that the operating element will be required to supply power to only one controlled element at a given time, each controlled element having an off or non-operated position in which it applies no reverse force against the operating element.

Another object is to provide improved guide means for a moving element which furnishes great resistance to lateral displacement but substantially no resistance along the line of designed movement.

The above and other objects as well as various features of novelty and advantages of the invention will be apparent from the following description of certain exemplary embodiments of the invention, reference being made to the accompanying drawings thereof wherein:

Fig. 1 is a front perspective view of one form of temperature control embodying the invention;

Fig. 2 is a similar perspective view in section;
Fig. 3 is a full front elevation;
Fig. 4 is a top plan view;
Fig. 5 is a top plan view of a modified or dual action form of temperature control;
Fig. 6 is a front elevation taken on the line 6—6 of Fig. 5;
Fig. 7 is a vertical section taken on the line 7—7 of Fig. 5;
Fig. 8 is a side elevation taken on the line 8—8 of Fig. 5; and
Fig. 9 is a vertical section taken on the line 9—9 of Fig. 5.

The control apparatus of the present invention has been developed in connection with temperature responsive actuating means and will be discussed specifically in this connection but this is done for clarity of disclosure and without intent to limit the invention in its broader aspects by such specific reference. There are, indeed, many different types of systems which derive movement of control from temperature changes. The type chosen for illustration herein is one wherein bi-metallic elements, tube and rods, are connected together at one end and produce differential straight-line or rectilinear movement at the other end.

For example, one member of high heat coefficient of expansion, such as a tube 20 of copper, brass, stainless steel or the like is connected at one end, as by a sleeve or ferrule 21 and solder, to another member of very low coefficient of expansion, such as a rod 22 of Invar metal or the like. The other end of the tube is attached to a fixed anchorage, such, for example, as the wall of a water filled boiler or a liquid filled well which is secured in the wall of a boiler. The particular details of this part of the apparatus are not of primary concern in the present invention except that the rod 22 should have as nearly rectilinear movement as possible.

To insure very precise lateral guidance of the rod 22 a base 24 through which the rod passes—and which here is shown as an anchorage for the outer end of the tube 20—is provided with a very thin but relatively very wide sheet 25 which is firmly secured in assembly at one end and which snugly embraces the rod at its other end. The sheet will have a hole which closely fits around the rod without binding or where the rod movement is not so great as to materially bend the sheet, the sheet may be secured to the rod. In any event, the sheet is so thin that it interposes substantially no opposition to the axial movement of the rod as produced by temperature changes and expansion and contraction of the tube. The fixed end of the sheet 25 may conveniently be held securely against lateral displacement by clamping it to the base 24 by a block 26 and clamping means presently to be described.

The end of the rod 22 is pointed or knife-edged to engage a lever, beam, or armature 30 which near one end fulcrums on the rounded end of an adjustment screw 31 and which at its other end acts upon the actuator or pin 32 of a switch 33. The switch is of the snap action micro type which requires only a very small movement for operation. It may be secured to the base 24, as by screws 34. The outer end of the lever 30 is pressed down by a spring 35 carried on a pin 36 mounted in a bracket 37 held by the switch mounting screws 34. The spring 35 is accurately centered on the axis of the switch pin 32 so as to exert no turning force on the lever or beam 30, leaving the entire turning influence to the rod 22 acting on the lever against the fulcrum 31.

The lever or armature 30 is attached to a relatively very wide and very thin aligning sheet 38, as by screws 39, the other end of the sheet being clamped to the block 26 by a block 40 and a bar 41, the assembly being secured to the base 24 by a cap screw 42. The aligning sheet 38 is so very thin, say .01 inch or thinner, compared to its width, say ¾ inch or more, that its strength against sidewise bending as compared to vertical bending is in the order of 5625 to 1 or more.

The head of the adjustment screw 31 is provided with a pointer and the bar below the head is provided with a scale 43 which is clamped in calibrated position, as by screw 44. The scale may be marked in degrees for convenience in adjustment. The adjustment screw 31 has a tight fit in the bar, the bar being slotted at the end to provide a resilient binding effect on the screw for this purpose.

In operation, when the heat on the tube 20 is increased the tube expands and since its upper end is anchored and the rod 22 is fastened at its lower end to the tube and has substantially no expansion in length the rod will move down and its upper end will allow the lever or beam 30 to swing down about the lower end of the adjustment screw 31 as a fulcrum. The spring 35 moves the outer end of the lever down and when it moves far enough it will operate the pin 32 of the switch and actuate the switch.

The spring 35 acts directly in line with the pin 32 and is strong enough to operate the switch readily. Only an extremely small movement and force are needed to operate the switch once the lever engages the pin 32. The lever stops on the pin stop or, if desired, against a stop buffer provided on the top of the switch casing so that the pin and switch mechanism are not injured.

The switch may be either of the normally open or normally closed type, depending on its control connections but it may be assumed for clarity that it is normally closed (but held open by pressure of the spring 35) and that a decrease in temperature on the tube (say below 180 F.) causes the switch to close by action of the lever against the spring 35. That is, the switch will move to its "on" position when pressure is removed from its operating pin 22. This, for example, may cause heat to be supplied to the boiler liquid in which the bi-metallic element is immersed.

After the tube 20 cools and the rod 22 has pushed the lever 30 away from the switch pin, continued cooling only causes further movement of the lever away from the switch pin. If the tube, rod or lever breaks or gets out of order the switch is opened directly by the spring 35 and heat is cut off. This is a fail-safe condition.

The guide sheet 38 is so thin that it does not act as a spring on the lever but will hold its end in tension, as would any flexible strand, if the end of the lever should tend to move either way out of its normal position; however, the sheet 38 is so wide and strong laterally that it fully resists any tendency of the lever to shift out of position sidewise and thus keeps the three points of action on the lever precisely aligned. The guide sheet does not exert any appreciable force on the lever tending to turn it, leaving the lever entirely to the action of the rod 22, spring 35 and fulcrum 31.

The dual action switch shown in Figs. 5 to 9 is, in its basic parts, exactly the same as the single action switch just described and the corresponding parts will be designated by the same reference characters with a prime (') added. There is the tube 20', sleeve or ferrule 21', rod 22', base 24', rod guide sheet 25', clamp block 26', lever or armature 30', adjustment screw 31', switch actuator pin 32', switch 33', screws 34', spring 35', pin 36', bracket 37', lever guide sheet 38', screws 39', block 40', bar 41', cap screws 42', scale 43', and clamp screws 44'.

Means are added for causing the same rod 22' to operate another switch 50, which may be a limit switch, required, for example, to be normally open (but held closed by a spring) and to be opened when the temperature rises to a set limit. These means include a transverse pin 51 secured to the rod 22' near its end and acting upon the top of the bifurcated end of a lever or armature 52 which turns about fulcrum pins 53 mounted in the base 24'.

The outer end of the lever 52 is threaded and split and frictionally retains an adjustment screw 54 which operates the actuating pin 55 of the switch 50. A spring 56 acts directly in line with the axis of the pin 55 and urges the end of the lever and the screw down to operate the pin 55 and close the switch, the spring acting against a bracket 57 secured to the base 24' by screws 58 which also secure the switch to the base. The spring 56, like the springs 35 and 35', exerts no turning influence on the lever. The head of the adjustment screw is provided with a pointer and the bracket 57 carries a scale 59 held by clamp screws 60, the scale, as before, preferably being marked in degrees of temperature. The adjustment screw in this case is carried by the lever instead of a fixed part because the fulcrum 53 is fixed and is below the lever where it would not be convenient for access in making adjustments.

At some point along its length, here intermediate its ends, the lever 52 is provided with a very thin lateral guide sheet 61 which is secured to the lever, as by a screw 62, and to the base 24', as by a screw 63. As before, the sheet is so very thin so as to offer no interference with the other forces and reactions on the lever and is relatively so very wide so as to strongly resist any tendency of the lever to get out of alignment laterally.

In the second form the operation of the switch 33' is exactly the same as the operation of the corresponding switch 33 in the first form.

As to the operation of the second switch 50, shown best in Figs. 8 and 9, there is no action while the rod 22' is in its upper position acting against the lever 30' to lift it from the switch pin 32' to allow the contacts of switch 33' to close (at lower temperature); but when the temperature increases and the upper end of the rod 22' moves down, the transverse pin 51 on the rod 22' will move down and when it moves down far enough it will engage the top surface of the bifurcated end of the lever 52 and turn the lever about the rounded ends of the pins 53 as a fulcrum. This will move the other end of the lever 52 up, carrying with it the adjusting screw 54. The pin 55 of switch 50 will be released and the switch contacts will change position.

During this movement the tip end of the rod 22' moves entirely away from the lever 30' and this lever is left in a balanced position on the switch pin 32' or on a buffer stop seat on the switch casing, the guide sheet 38' being so thin as to have substantially no influence on the position of the lever in the vertical plane but keeping it accurately located laterally.

It may be assumed for clarity of description that switch 50 is the normally open type (held closed by spring 56) and that it is allowed to open when the adjusting screw 54 is raised. Also it may be assumed that switch 50 is a limit switch which will cut off the application of heat when an upper limiting temperature is reached. For a domestic hot water boiler this upper temperature may, for example, be 240° F. If the spring 35' of switch 33' should break, the control for switch 50 would shut off the heat when a maximum set temperature was reached; and if the spring 56 of switch 50 should break, the switch would open and cut off the heat supply just as if the temperature controlling means had functioned. Both of these actions are "fail-safe" conditions.

When the temperature is below the range at which the switch 50 is operated by the lever 52 the transverse pin 51 stands clear of the lever; and, as already explained, in the range of operation of the switch 50 the end of the rod 22' stands clear of the lever 30', the result being that the bi-metallic temperature responsive element is subjected to only one loading at a time. The adjustment screws could be set so that the actions would be quite close together but there is never enough double loading to materially affect the switch actions. The springs are made just strong enough to operate the switches and these switches are of a type which require only slight force for actuation, hence the bi-metallic element has so much over strength that it would not be materially taxed or thrown off calibration if it should have to act against both springs at once. Care is taken that the springs 35' and 56 do not act through the rod 22' at the same time so as to affect the calibration for which the other switch is set to act, suitable buffer stops at the switch enclosures being provided to prevent this if the switch pins have any overtravel after being actuated.

It is thus seen that the invention provides simple, sturdy and dependable "fail-safe" temperature control apparatus. It has a very rapid response, a low differential of control movement, maintains accurate calibration even with high over-rides in temperature, combines the action of two temperature responsive elements in one, employs snap-action switches of a dependable character, and in other ways constitutes a considerable advance in the art.

While certain embodiments of the invention have been described for purposes of illustration it is to be understood that there may be various embodiments and changes within the limits of the invention.

What is claimed is:

1. Movement responsive apparatus, such as a temperature responsive device, comprising in combination, a rectilinearly moving operating element, a switch having an actuating pin, a fulcrum ranged along a line with said operating element and said switch actuating pin, a floating lever acted upon at spaced points along its length by said switch actuating pin, said operating element and said fulcrum, a very thin and relatively wide sheet attaching said lever to a fixed anchorage, the attaching sheet being so thin as to exert substantially no vertical turning force on said lever but being so wide as to hold it securely against lateral displacement, and a spring acting on said lever directly in line with the axis of said switch actuating pin so as to have no turning influence on the lever.

2. Movement responsive apparatus, such as a temperature responsive device, comprising in combination, a rectilinearly moving operating element, a switch having an actuating pin, a fulcrum ranged along a line with said operating element and said switch actuating pin, a floating lever acted upon at spaced points along its length by said switch actuating pin, said operating element and said fulcrum, a very thin and relatively wide sheet attaching said lever to a fixed anchorage, the attaching sheet being so thin as to exert substantially no vertical turning force on said lever but being so wide as to hold it securely against lateral displacement, said sheet being so thin relative to its width and length that the force necessary to bend it laterally a given distance is 5000 times or greater than the force necessary to bend it vertically by the same amount, and a spring acting on said lever directly in line with the axis of said switch actuating pin so as to have no turning influence on the lever.

3. Movement responsive apparatus, such as a temperature responsive device, comprising in combination, a rectilinearly moving operating rod, a switch having an actuating pin, a fulcrum ranged along a line with said operating rod and said switch actuating pin, a floating lever engaging at spaced points along its length with said operating rod, said switch operating pin and said fulcrum, a spring acting upon said lever on the opposite side from and directly in line with the axis of the switch actuating pin, and a very thin and relatively very wide sheet attaching said lever to a fixed anchorage, the operating rod having a lever engaging element which at times moves clear of engagement with the lever after the spring has balanced the lever between the switch actuating pin and said attaching sheet.

4. Apparatus as set forth in claim 3 in which said operating rod operates in a tube with wide clearance space therewith and which further includes a very thin and relatively very wide sheet attached to a fixed anchorage at one end and forming a guide for said rod at its other end, the rod guiding sheet being so very thin and long that it will exert substantially no force on the rod if bent by it in its limited travel but being of such width that it will hold the rod accurately in line for engagement with the lever at the proper place.

5. Movement responsive apparatus, such as a temperature responsive device, comprising in combination, a base, an expansion tube secured at one end to said base, an operating rod in said tube passing through said base and attached at its outer end to said tube, a plurality of switches with actuating pins carried by said base, levers for operating said switch pins, fulcrums for said levers, a plurality of lever engaging elements on said rod for operating said levers when the rod is moving in different directions, the operating elements being arranged to operate the levers at different times and to move clear of one lever when moving toward operating position of the other element with the other lever, and springs acting against said levers in line with said switch pins to balance the levers in floating position when the levers are cleared by the operating elements on said rod.

6. Apparatus as set forth in claim 5, which further includes very thin and relatively very wide and long sheets attaching said levers to fixed anchorages on said base, the attaching sheets being so very thin and long and attached to the levers in line with the floating positions of the levers when held against the switch pins by said springs that the sheets exert substantially no force on the levers tending to turn them but hold them securely in position laterally.

7. Apparatus as set forth in claim 5, characterized by the fact that the end of the rod and a transverse pin carried by the rod near its end constitute the lever operating elements of the rod, the operating elements acting on the levers in a direction to move them against the springs away from the actuating pins of the switches.

References Cited in the file of this patent

UNITED STATES PATENTS

| | | |
|---|---|---|
| 1,944,358 | McNamara | Jan. 23, 1934 |
| 2,721,915 | Huntley | Oct. 25, 1955 |